(12) United States Patent
Schmidt et al.

(10) Patent No.: US 7,022,038 B2
(45) Date of Patent: Apr. 4, 2006

(54) TWO-MODE COMPOUND-SPLIT ELECTRICALLY VARIABLE TRANSMISSION

(75) Inventors: Michael R. Schmidt, Carmel, IN (US); Donald Klemen, Carmel, IN (US); Alan G. Holmes, Fishers, IN (US)

(73) Assignee: General Motors Corporation, Detroit, MI (US)

( * ) Notice: Subject to any disclaimer, the term of this patent is extended or adjusted under 35 U.S.C. 154(b) by 153 days.

(21) Appl. No.: 10/819,436

(22) Filed: Apr. 7, 2004

(65) Prior Publication Data

US 2005/0227801 A1    Oct. 13, 2005

(51) Int. Cl.
*F16H 3/72* (2006.01)
(52) U.S. Cl. ........................................ 475/5
(58) Field of Classification Search .................... 475/5; 180/65–67

See application file for complete search history.

(56) References Cited

U.S. PATENT DOCUMENTS 6,527,658 B1 *   3/2003   Holmes et al. ................ 475/5

* cited by examiner

*Primary Examiner*—Dirk Wright
(74) *Attorney, Agent, or Firm*—Christopher DeVries

(57) ABSTRACT

A compound-split electrically variable transmission has two electrical power units, two planetary gearsets, a prime mover, and two selectively engageable torque-transmitting mechanisms. The torque-transmitting mechanisms are selectively engaged to provide a reverse and first range and a second range of operation, wherein the reverse and first range is an input-split range of operation and the second range is a compound-split range of operation. The torque-transmitting mechanisms are simultaneously engaged at an interchange point between the first and second ranges of operation. This interchange point is a synchronous speed interchange point, such that the torque-transmitting mechanisms are engaged and disengaged without slipping forces being transmitted.

9 Claims, 5 Drawing Sheets

TWO-MODE COMPOUND-SPLIT ELECTRICALLY VARIABLE TRANSMISSION

TECHNICAL FIELD

This invention relates to variable ratio transmissions and, more particularly, to electrically variable transmissions providing at least two ranges.

BACKGROUND OF THE INVENTION

Electrically variable transmissions have been proposed in many forms including at least one two-mode compound-split transmission form. The U.S. Pat. No. 5,931,757, issued to Schmidt on Aug. 3, 1999, and assigned to the assignee of the present invention, describes a compound-split power transmission. The transmission described therein is an electrically variable transmission, which employs two electric power units that are controlled in a variable speed manner to distribute power to an output portion of the transmission. The transmission also includes a prime mover, such as an internal combustion engine, which distributes power to either one or more of the electric units and to the transmission output. During the first mode of operation, the power transmission provides an input split of power and during the second mode of operation or range, the transmission provides a compound-split of power distribution.

The prior art transmission has two working planetary gearsets and one reduction planetary gearset. Of the two working planetary gearsets, the engine or prime mover is connected to one member of one planetary unit, a first of the electrical units is connected to a member of each of the planetary units, and the second electrical unit is connected to one member of the one of the planetary units. The transmission output shaft is connected to members of both planetary units during the compound-split mode of operation of the transmission.

SUMMARY OF THE INVENTION

It is an object of the present invention to provide an improved two-mode compound-split electrically variable transmission.

In one aspect of the present invention, the two-mode compound-split electrically variable transmission includes two planetary gearsets that are interconnected, two electrical power units, and a prime mover.

In another aspect of the present invention, the electrically variable transmission has two selectively engageable torque-transmitting mechanisms, one of which is engaged for a reverse range and a first range or low mode operation and the other of which is engaged for a second range or high mode operation.

In yet another aspect of the present invention, the prime mover is connected with one member of each of the planetary gearsets.

In yet still another aspect of the present invention, one of the electrical units is connected directly with one member of another planetary gearset, and through the first of the torque-transmitting mechanisms to the output mechanism of the transmission.

In a further aspect of the present invention, the other of the electrical units is continuously interconnected with one member of one of the planetary gearsets and is either directly connected with a member of the other planetary gearset in one embodiment or selectively connectible through a second of the torque-transmitting mechanisms to a member of the other planetary gearset.

In still a further aspect of the present invention, the transmission output mechanism is continuously connected with one member of one of the planetary gearsets intermediate the first and second of the electric power units.

In still yet a further aspect of the present invention, the output mechanism of the transmission is selectively connectible with one of the electrical power units through one of the torque-transmitting mechanisms.

DESCRIPTION OF THE EXEMPLARY EMBODIMENTS

Figure 1:
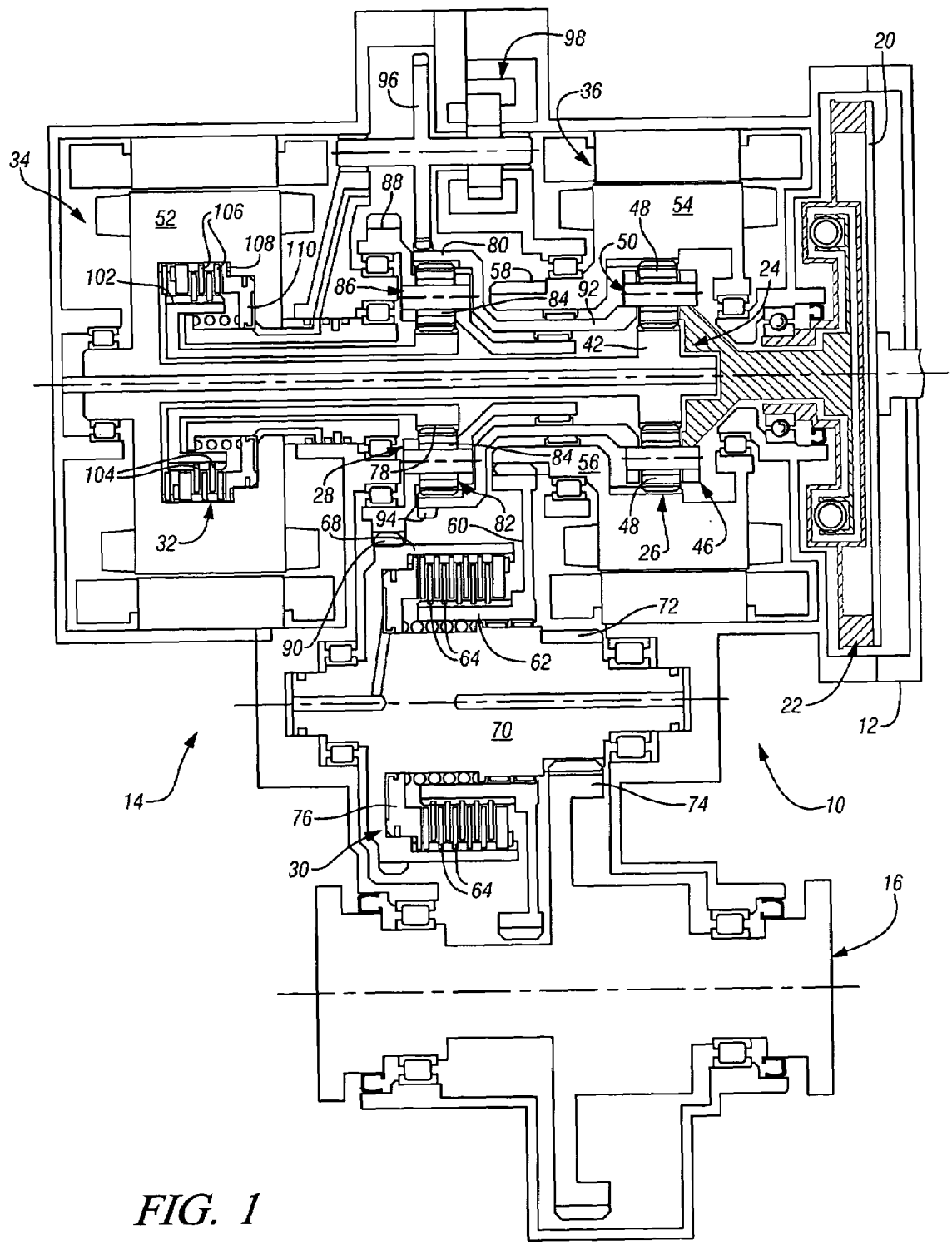
FIG. 1 is a cross-sectional elevational view of a transmission incorporating the present invention.

Referring to the drawings, wherein like characters represent the same or corresponding parts throughout the several views, there is seen in FIG. 1 a powertrain 10 including a prime mover or engine 12, an electrically variable transmission (EVT) 14, and a final drive transmission output mechanism 16. The engine 12 is a conventional prime mover such as a spark ignition engine or diesel engine. The final drive transmission output mechanism 16 is a conventional differential mechanism. The engine 12 has a crankshaft or engine output 18, which is connected with a conventional flywheel 20. The flywheel 20 is connected with a damper assembly 22, which in turn is connected with an input shaft 24.

The EVT 14 includes a pair of planetary gearsets 26 and 28, a pair of torque-transmitting mechanisms 30 and 32, a first electrical unit 34 and a second electrical unit 36. The electrical units 34 and 36 are conventional motor/generator (M/G) devices. The torque-transmitting mechanisms 30 and 32 are conventional rotating type torque-transmitting mechanisms.

Figure 2:
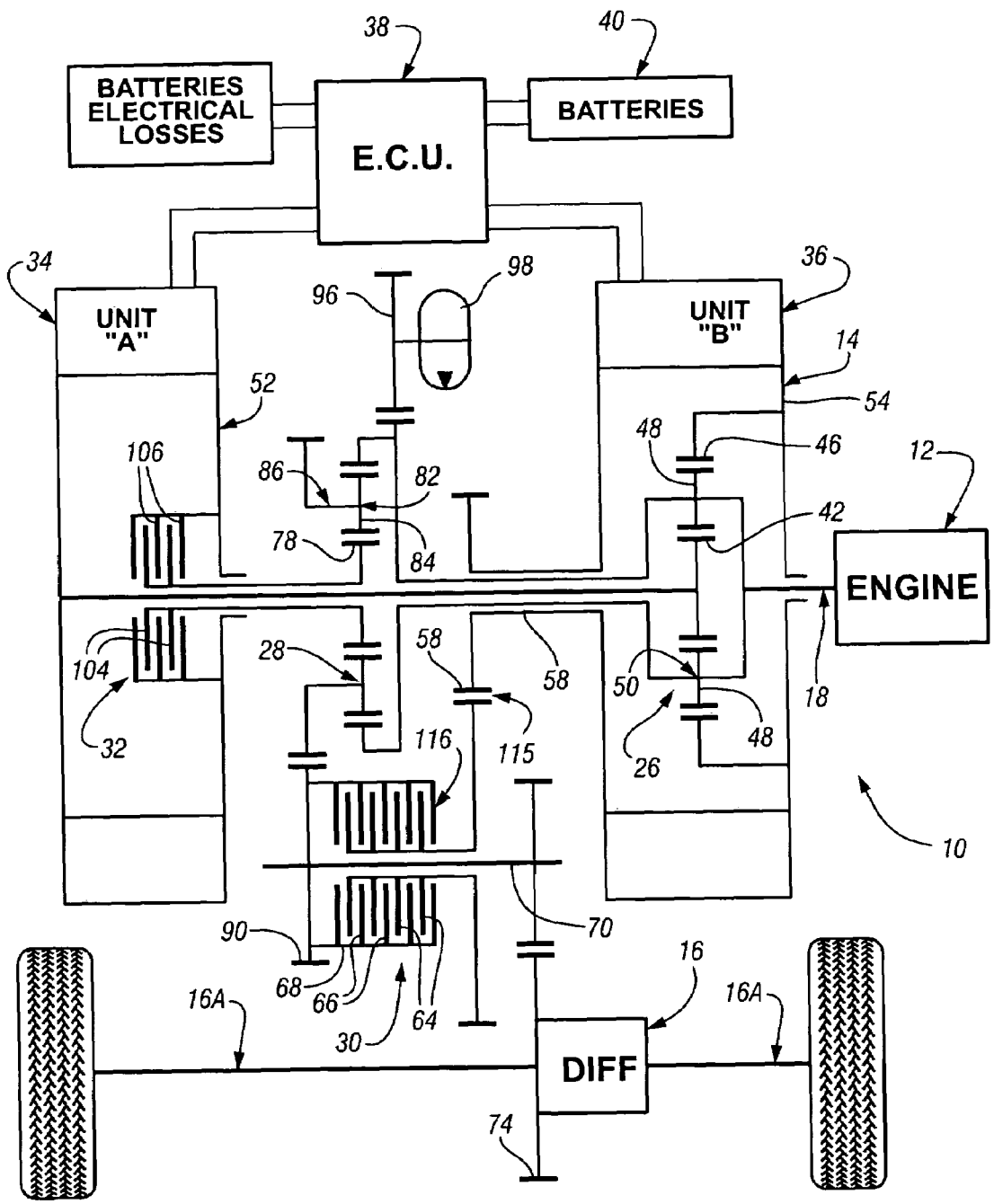
FIG. 2 is a schematic representation of the transmission shown in FIG. 1.

As seen in FIG. 2, the EVT 14 includes a conventional electronic control unit 38 and a bank of conventional batteries 40. The electronic control unit (ECU) 38 is operable in a well-known manner to control the distribution of power between the electrical units 34 and 36 and the batteries 40. As those skilled in the art will recognize, during some operational conditions, the electrical units 34 and 36 will supply power from one to the other and also to the batteries 40 and at other times will collect power from the batteries 40 to supply power to the transmission output.

The planetary gearset 26 includes a sun gear member 42, a ring gear member 46, and a planet carrier assembly member 50. The planet carrier assembly member 50 includes a plurality of pinion gears 48 that are rotatably mounted on a planet carrier or spider member 50. The input shaft 24 and therefore engine output 18 are continuously connected with a planet carrier member 50.

The sun gear member 42 is continuously drivingly connected with a rotor member 52 of the electrical unit 34. The ring gear member 46 is formed integrally with a rotor 54 of the electrical unit 36. The ring gear member 46 has an output hub 56 integral therewith on which is formed a drive gear 58. The drive gear 58 is in continuous mesh with a driven gear 60, which has a hub portion 62 forming a splined member, which is a portion of the torque-transmitting mechanism 30.

The hub 62 has splined therewith a plurality of clutch plates 64, which are alternately spaced with a plurality of clutch plates 66. The clutch plates 66 are splined to a clutch hub 68, which has a shaft portion 70 in which is formed a drive gear 72 disposed in meshing relationship with a driven gear 74. The driven gear 74 provides an input gear for the transmission final drive mechanism 16, which includes output shafts 16A.

The torque-transmitting mechanism 30 includes a fluid-operated clutch 76, which when pressurized will enforce engagement of the clutch plates 64 and 66 to provide power transmission between the gear 60 and the shaft portion 70.

The planetary gearset 28 includes a sun gear member 78, a ring gear member 80, and a planet carrier assembly member 82. The planet carrier assembly member 82 includes a plurality of pinion gears 84 disposed on a planet carrier member 86 and meshing with both the sun gear member 78 and the ring gear member 80. The planet carrier member 86 has formed therewith a drive gear 88, which meshes with a driven gear 90 formed on the clutch hub 68. Thus, the planet carrier member 86 rotates in unison with the drive gear 72 of the torque-transmitting mechanism 30.

The ring gear member 80 is continuously connected through a sleeve shaft 92 with the planet carrier member 50 of the planetary gearset 26. A gear member 94 is formed on the outer surface of the ring gear member 80. The gear 94 meshes with a gear 96, which drives a conventional fluid pump 98. The fluid pump 98 supplies fluid pressure to the transmission for controlling the engagement of the torque-transmitting mechanisms 30 and 32 and also providing lubrication and cooling fluid for the mechanical portions of the EVT 14.

The sun gear member 78 has a sleeve shaft portion 100, which has formed thereon or integrally secured therewith a hub 102 on which is splined a plurality of clutch plates 104 disposed alternately with a plurality of clutch plates 106. The clutch plates 106 are drivingly connected with the rotor 52 to a spline 108 formed thereon.

The torque-transmitting mechanism 32 has a fluid-operated piston 110, which when pressurized will enforce engagement of the clutch plates 104 and 106 to provide a drive connection between the rotor 52 and the sun gear member 78.

The torque-transmitting mechanism 30 is engaged to provide a first range of EVT operation, which is an input split range. The torque-transmitting mechanism 32 is engaged to provide a second range or mode of operation, which is a compound-split mode of operation. The interchange between the first range and the second range is a synchronous interchange such that the torque-transmitting mechanisms 32 and 30 are simultaneously engaged.

Figure 3:
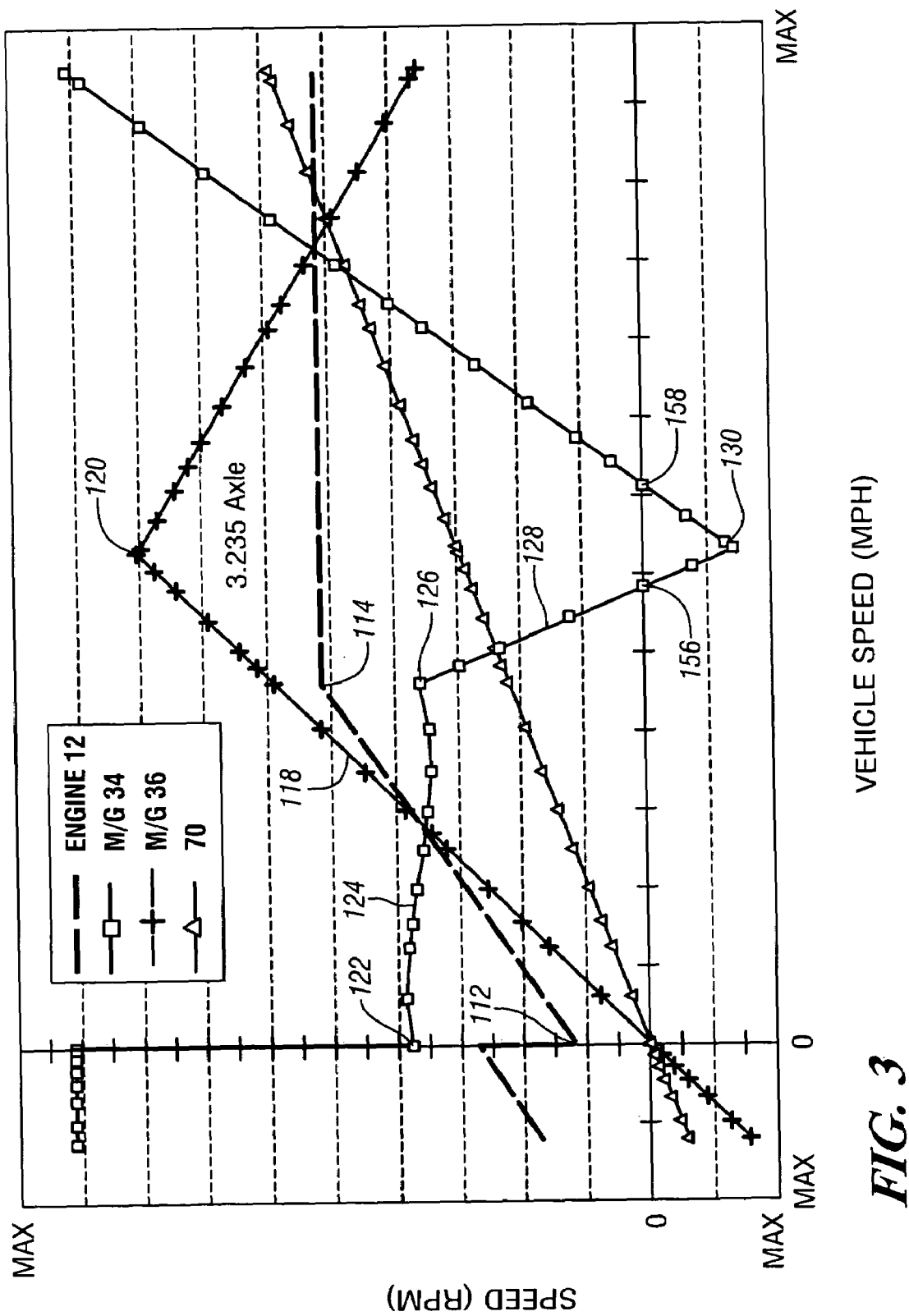
FIG. 3 is a chart describing the speeds of the electrical units, the engine, and the transmission output in relation to vehicle speed.

The speed characteristics of the engine 12, the electrical unit 34, the electrical unit 26, and the transmission output shaft 70 are depicted in FIG. 3. As seen in FIG. 3, the engine speed increases from an idle speed at point 112 to a driven speed at point 114. The speed of unit 36 increases from the 0/0 origin 116 along line 118 to a maximum speed at point 120. The speed of unit 34 progresses from a point of zero vehicle speed at 122 along line 124 to a point 126. The speed of the electrical unit 34 then decreases along the line 128 to a maximum negative speed point at 130. At points 120 and 130, the speed of the input and output portions of the torque-transmitting mechanisms 30 and 32 are each operating at synchronous speeds. This can be seen in FIG. 4 where the hubs 62 and 68 are operating along line 140 prior to the ratio interchange point at 142, after which the speed of hub 62 decreases along line 144 while the speed of hub 68 increases along line 146.

The speed of the rotor 52 operates along line 148 prior to the shift point and along line 150 after the shift point. The speed of the shaft 100 operates along line 152 prior to the shift point and along line 150 after the shift point. Note that at point 154, both the inner and outer portions of the torque-transmitting mechanism 32 are operating at the same speed, and at point 142 the inner and outer portions of the torque-transmitting mechanism 30 are operating at the same speed. Thus, these devices can be engaged and disengaged at this point with no slippage between their respective clutch plates. Note that the speed of the hub 62 represented by lines 140 and 144 are similar to the curve of the speed of the rotor 54 represented by line 118 in FIG. 3. Also, the speed represented by curves 148 and 150 of the outer portion of torque-transmitting mechanism 32 is identical with the speed of the rotor 52 represented by lines 124 and 128 in FIG. 3.

It should also be noted in FIG. 3 that at points 156 and 158, the speed of the rotor 52 is zero such that these are mechanical operating points within the EVT 14. At point 156, the sun gear member 42 is stationary and at point 158, the sun gear members 42 and 78 are both stationary. At point 156, the torque-transmitting mechanism 30 is engaged such that the power flow is from the engine and the electrical unit 36 through the planetary gearset 26 to the transmission output mechanism 16. At point 158, the power flow is from the engine 12 and the electrical unit 36 through the planetary gearset 28 to the final transmission output mechanism 16. The amount of power provided in these instances by the electrical unit 36 varies depending upon the amount of power necessary to operate the vehicle. In some instances, there will not be a need for sufficient power to have the electrical unit 36 and the engine 12 both providing power. At that time, it will be most efficient to permit the engine 12 to supply all the power to the transmission 14 to the transmission output mechanism 16.

Figure 4:
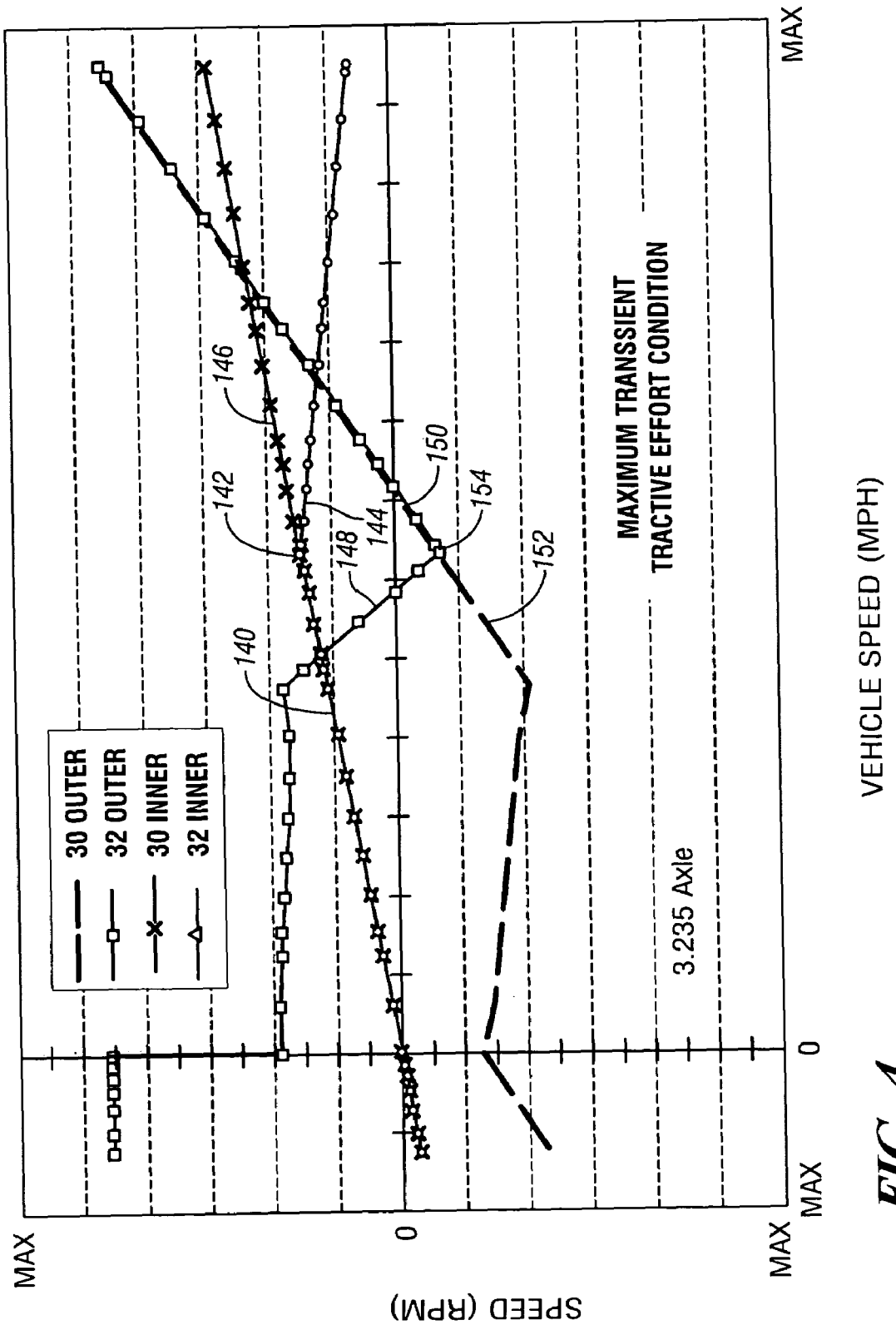
FIG. 4 is a chart describing the speeds of portions of the planetary gearsets as well as portions of the torque-transmitting mechanisms versus vehicle speed.

The curves in FIGS. 3 and 4 are representative of the maximum power requirement or the maximum tractive effort condition required by the transmission. Also, as the conditions surrounding the shift points represented by 120 and 130, the operating condition of these electrical units 34 and 36 is dependent upon the amount of power required by the vehicle for the operation thereof. At maximum power output or maximum power requirement, the electrical units 34 and 36 will both operate as motors prior to the shift point, while following the shift point the unit 34 will operate as generator and the unit 36 will operate as a motor.

Also, in forward operation prior to the shift point, the unit 34 operates as a generator up until at least the point 156 and the unit 36 operates as a motor up until the point 156. After the point 158, the unit 34 operates as a motor and the unit 36 operates as a generator. The operation of the units as generators provides sufficient electrical energy to maintain the batteries 40 in a substantially fully charged state. During operation if the charge on the batteries is low, the units 34 and 36 can be operated as generators at any time; however, this may reduce the amount of power available at the transmission output mechanism 16.

Figure 5:
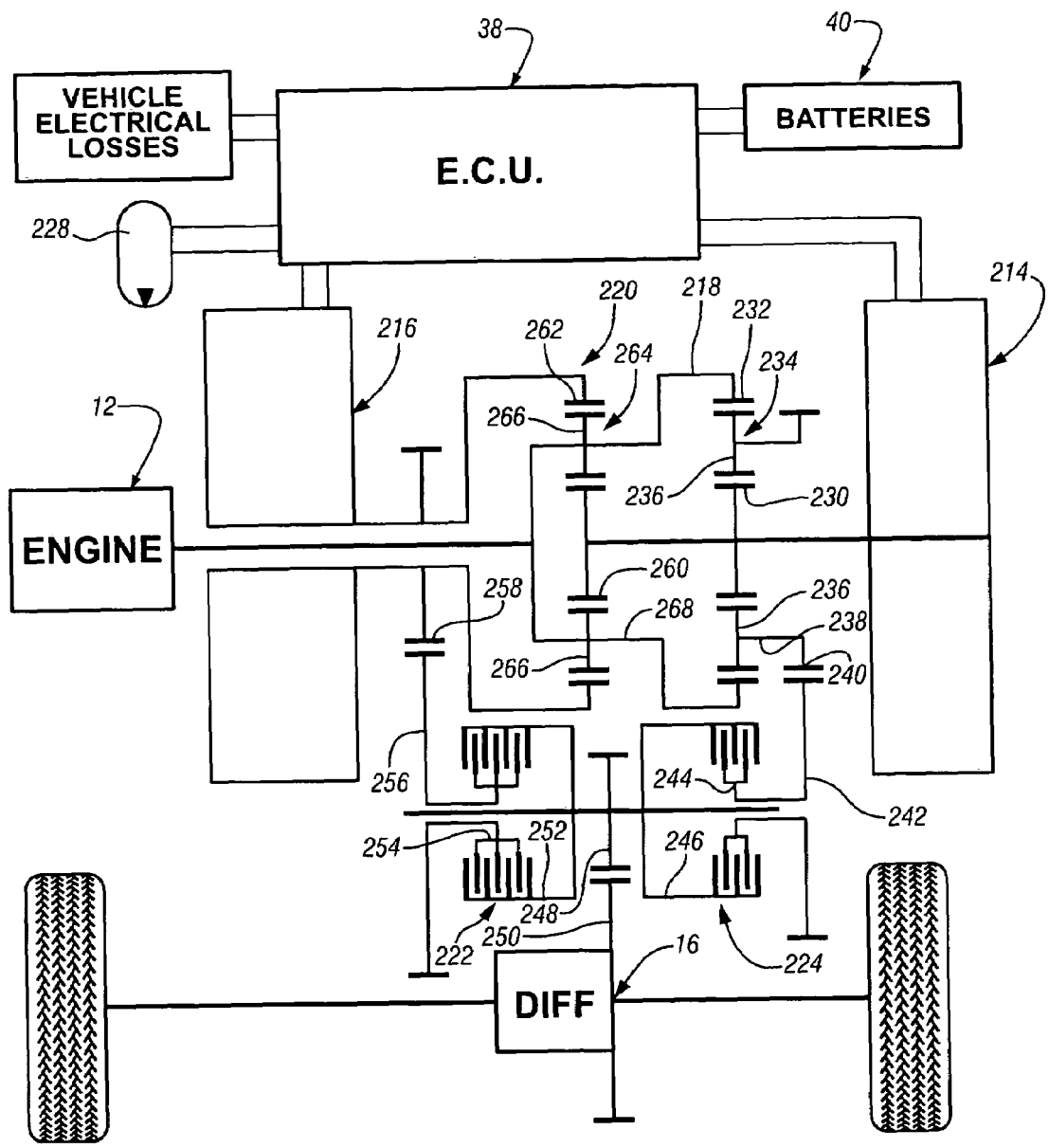
FIG. 5 is a schematic representation of an alternative embodiment of the present invention.

An alternative embodiment represented by powertrain 210, shown in FIG. 5, includes the engine or prime mover 12, an electrically variable transmission (EVT) 212, and the transmission final drive mechanism 16. The EVT 212 includes a pair of electrical power units 214 and 216, a pair of planetary gearsets 218 and 220, and a pair of selectively engageable torque-transmitting mechanisms 222 and 224.

The electrical power units 214 and 216 are controlled by the conventional electronic control unit (ECU) 38, which as described above provides power to and from the batteries 40 to the units 214 and 216 as well as controlling power interchange between the two units 214 and 216. The EVT 212 in FIG. 5 has an electrically driven control pump 228. The embodiment shown in FIG. 5 therefore requires that there is always battery power available to at least drive the pump 228 since this pump provides not only the control pressure for the engagement of the torque-transmitting mechanisms 222 and 224 but also supplies cooling and lubrication fluid for the mechanical components of the EVT 212.

The planetary gearset 218 includes a sun gear member 230, a ring gear member 232, and a planet carrier assembly member 234. The planet carrier assembly member 234 includes a plurality of pinion gear members 236 rotatably mounted on a planet carrier member 238 and disposed in meshing relationship with both the sun gear member 230 and the ring gear member 232. The planet carrier member 238 has included therewith a gear 240, which meshes with a gear 242, which in turn drives an inner hub 244 of the torque-transmitting mechanism 224. An outer hub 246 of the torque-transmitting mechanism 224 is drivingly connected through a pair of gears 248 and 250 with the transmission final drive mechanism 16. The gear 248 is also drivingly connected with an outer hub 252 of the torque-transmitting mechanism 222. An inner hub 254 of the torque-transmitting mechanism 222 is continuously connected with a gear member 256, which in turn meshes with a gear 258, which is continuously driven by the electric power unit 216.

The planetary gearset 220 includes a sun gear member 260, a ring gear member 262, and a planet carrier assembly member 264. The planet carrier assembly member 264 includes a plurality of pinion gears 266 that are rotatably mounted on a planet carrier member 268 and disposed in meshing relationship with both the ring gear member 262 and the sun gear member 260.

The planet carrier member 268 is continuously drivingly connected with the ring gear member 232 and with the engine 12. The sun gear members 260 and 230 are continuously drivingly interconnected and also continuously drivingly connected with the electrical power unit 214. The ring gear member 262 is continuously drivingly connected with the electrical power unit 216.

The EVT 212 shown in FIG. 5 is similar in operation to the EVT 14 shown in FIGS. 1 and 2. The torque-transmitting mechanism 222 is engaged for a first range or input-split mode of operation and the torque-transmitting mechanism 224 is engaged for a second range or compound-split mode of operation. The operating conditions or parameters for the EVT 212 are substantially identical with the EVT 14. The primary difference between these two embodiments is that in EVT 14 the sun gear members of the planetary gearsets are interconnected through the torque-transmitting mechanism 32 and therefore in the second range of operation are both drivingly connected with the electrical power unit 34; while in the EVT 212 the sun gear members of the planetary gearsets are continuously interconnected during both ranges of operation. However, during the first range of operation, the power flow is through the planetary gearset 220 and the torque-transmitting mechanism 222, while in the second range of operation, the power flow is through the planetary gearset 218 and the torque-transmitting mechanism 224.

However, at the interchange point, that is, between the two modes of operation, the torque-transmitting mechanisms 222 and 224 are operating at the same speed, which permits the synchronous interchange for these friction devices. In the EVT 212 it is possible to employ mechanical type synchronizer clutches or jaw clutches, since the clutches are disposed in a position within the transmission where it is possible to provide the mechanical and/or electrical shift mechanisms required to operate these structures.

Obviously, many modifications and variations are possible in light of the above disclosure. Therefore, it should be understood that the invention is only to be limited by the scope of the appended claims.

The invention claimed is:

1. A compound-split electrically variable transmission comprising:
    a prime mover;
    a first electrical power unit;
    a second electrical power unit;
    a transmission output mechanism;
    a planetary gear arrangement comprising:
        a first planetary gearset having a first member, a second member, and a third member;
        a second planetary gearset having a first member, a second member, and a third member;
        a first selectively engageable torque-transmitting mechanism; and
        a second selectively engageable torque-transmitting mechanism;
    said prime mover being continuously connected with both said first member of said first and second planetary gearsets;
    said first electrical power unit being continuously connected with said second member of said first planetary gearset and to a member of a group consisting of said second member of said second planetary gearset and said second selectively engageable torque-transmitting mechanism;
    said second electrical power unit being continuously connected with said third member of said first planetary gearset and with said first selectively engageable torque-transmitting mechanism;
    said third member of said second planetary gearset being continuously connected with a member of a group consisting of said transmission output mechanism and said first selectively engageable torque-transmitting mechanism; and
    said first and second torque-transmitting mechanisms being selectively engageable to effect two continuously variable speed ranges between said prime mover and said transmission output mechanism.

2. The compound-split electrically variable transmission defined in claim 1 further wherein:
    said first members of both said first and second planetary gearsets are a planet carrier assembly member and a ring gear member respectively, said second members of both of said first and second planetary gearsets are sun gear members, and said third members of said first and second planetary gearsets are a ring gear member and a planet carrier assembly member respectively.

3. The compound-split electrically variable transmission defined in claim 1 further wherein:

said first and second selectively engageable torque transmitting mechanisms are both rotating type torque transmitting mechanisms.

4. A compound-split electrically variable transmission comprising:
   a prime mover;
   a first electrical power unit;
   a second electrical power unit;
   a transmission output mechanism;
   a planetary gear arrangement comprising:
      a first planetary gearset having a first member, a second member, and a third member;
      a second planetary gearset having a first member, a second member, and a third member;
      a first selectively engageable torque-transmitting mechanism; and
      a second selectively engageable torque-transmitting mechanism;
   said prime mover being continuously connected with both said first member of said first and second planetary gearsets;
   said first electrical power unit being continuously connected with said second members of both said first and second planetary gearsets;
   said second electrical power unit being continuously connected with said third member of said first planetary gearset and with said first selectively engageable torque-transmitting mechanism;
   said third member of said second planetary gearset being continuously connected with said second selectively engageable torque-transmitting mechanism;
   said second torque selectively engageable transmitting mechanism being selectively connectible between said third member of said second planetary gearset and said transmission output mechanism and
   said first and second selectively engageable torque-transmitting mechanisms being selectively engageable to effect two continuously variable speed ranges between said prime mover and said transmission output mechanism.

5. The compound-split electrically variable transmission defined in claim 4 further wherein:
   said first members of both said first and second planetary gearsets are a planet carrier assembly member and a ring gear member, respectively, said second members of both of said first and second planetary gearsets are sun gear members, and said third members of said first and second planetary gearsets are a ring gear member and a planet carrier assembly member, respectively.

6. The compound-split electrically variable transmission defined in claim 4 further wherein:
   said first and second selectively engageable torque transmitting mechanisms are both rotating-type torque-transmitting mechanisms.

7. A compound-split electrically variable transmission comprising:
   a prime mover;
   a first electrical power unit;
   a second electrical power unit;
   a transmission output mechanism;
   a planetary gear arrangement comprising:
      a first planetary gearset having a first member, a second member, and a third member;
      a second planetary gearset having a first member, a second member, and a third member;
      a first selectively engageable torque-transmitting mechanism; and
      a second selectively engageable torque-transmitting mechanism;
   said prime mover being continuously connected with both said first member of said first and second planetary gearsets;
   said first electrical power unit being continuously connected with said second member of said first planetary gearset and said second selectively engageable torque-transmitting mechanism;
   said second electrical power unit being continuously connected with said third member of said first planetary gearset and with said first selectively engageable torque-transmitting mechanism;
   said third member of said second planetary gearset being continuously connected with said second selectively engageable torque-transmitting mechanism; and
   said first and second torque-transmitting mechanisms being selectively engageable to effect two continuously variable speed ranges between said prime mover and said transmission output mechanism.

8. The compound-split electrically variable transmission defined in claim 7 further wherein:
   said first members of both said first and second planetary gearsets are a planet carrier assembly member and a ring gear member, respectively, said second members of both of said first and second planetary gearsets are sun gear members, and said third members of said first and second planetary gearsets are a ring gear member and a planet carrier assembly member, respectively.

9. The compound-split electrically variable transmission defined in claim 7 further wherein:
   said first and second selectively engageable torque-transmitting mechanisms are both rotating-type torque-transmitting mechanisms.

* * * * *